US007905980B2

(12) United States Patent
Sinykin

(10) Patent No.: US 7,905,980 B2
(45) Date of Patent: Mar. 15, 2011

(54) METHOD OF MANUFACTURING PAINT ROLLER COVERS FROM A TUBULAR FABRIC SLEEVE

(75) Inventor: Daniel L. Sinykin, Bayside, WI (US)

(73) Assignee: Seamless Technologies, LLC, Janesville, WI (US)

( * ) Notice: Subject to any disclaimer, the term of this patent is extended or adjusted under 35 U.S.C. 154(b) by 577 days.

(21) Appl. No.: 12/015,612

(22) Filed: Jan. 17, 2008

(65) Prior Publication Data

US 2008/0264110 A1 Oct. 30, 2008

Related U.S. Application Data

(63) Continuation-in-part of application No. 11/740,119, filed on Apr. 25, 2007, now Pat. No. 7,503,191.

(51) Int. Cl.
*B29C 65/00* (2006.01)
*B32B 37/00* (2006.01)
(52) U.S. Cl. ........................... 156/294; 156/86; 156/229
(58) Field of Classification Search .................... 156/71, 156/84, 85, 86, 148, 149, 196, 198, 212, 156/213, 229, 293, 294, 303.1
See application file for complete search history.

(56) References Cited

U.S. PATENT DOCUMENTS 1,152,110 A 8/1915 Lockwood
1,660,538 A 2/1928 Whitney
1,791,741 A 2/1931 Moore
1,849,466 A 3/1932 Moore
2,411,842 A 12/1946 Adams
2,502,638 A 4/1950 Becht
2,600,955 A 6/1952 Barnes et al.
2,630,619 A 3/1953 Schmidt et al.
2,704,877 A 3/1955 Schmidt
2,737,702 A 3/1956 Schmidt et al.
2,752,953 A 7/1956 Schmidt
2,789,075 A 4/1957 Stahl
2,806,803 A 9/1957 Thackara et al.
2,920,372 A 1/1960 Sannipoli et al.
2,944,588 A * 7/1960 Sannipoli et al. ............. 156/294

(Continued)

FOREIGN PATENT DOCUMENTS

GB 2236124 A * 3/1991

(Continued)

*Primary Examiner* — Philip C Tucker
*Assistant Examiner* — Brian R Slawski
(74) *Attorney, Agent, or Firm* — Reinhart Boerner Van Deuren S.C.

(57) ABSTRACT

A method of manufacturing paint roller covers is disclosed in which the paint roller covers are manufactured from a seamless, tubular knitted pile fabric sleeve that is installed onto a core member. To facilitate the manufacture of the paint roller covers, the knitted pile fabric sleeve is initially placed upon the outside of a thin hollow cylindrical mounting tube, and the core member with an adhesive bonding material provided on the exterior surface thereof is inserted into the interior of the mounting tube. The knitted pile fabric sleeve is installed onto the exterior surface of the core member by withdrawing the mounting tube from the knitted pile fabric sleeve while maintaining the respective positions of the knitted pile fabric sleeve and the core member, with the knitted pile fabric sleeve being retained on the core member by the adhesive bonding material. The pile fabric covered core member may be finished into paint roller covers by cutting it to a desired size, combing and shearing the pile fabric to a desired length, beveling the edges of the paint roller covers, and vacuuming stray fibers from the paint roller covers.

22 Claims, 8 Drawing Sheets

U.S. PATENT DOCUMENTS

| | | | |
|---|---|---|---|
| 2,948,200 A | 8/1960 | Westerbarkey | |
| 3,010,867 A | 11/1961 | Sannipoli et al. | |
| 3,126,306 A | 3/1964 | Sherman | |
| 3,181,233 A | 5/1965 | Sannipoli et al. | |
| 3,226,799 A | 1/1966 | Grodberg et al. | |
| 3,226,952 A | 1/1966 | Cassady | |
| 3,299,672 A | 1/1967 | Schmidt | |
| 3,301,734 A | 1/1967 | Britton et al. | |
| 3,366,719 A | 1/1968 | Lueders | |
| 3,376,180 A | 4/1968 | Larson et al. | |
| 3,404,203 A | 10/1968 | Donald | |
| 3,429,522 A | 2/1969 | Cunningham et al. | |
| 3,430,543 A | 3/1969 | Cunningham | |
| 3,453,163 A | 7/1969 | Mills et al. | |
| 3,457,130 A | 7/1969 | Morrison | |
| 3,518,970 A | 7/1970 | Burns et al. | |
| 3,607,492 A | 9/1971 | Keith et al. | |
| 3,620,869 A | 11/1971 | Stump et al. | |
| 3,700,520 A | 10/1972 | Hielema | |
| 3,732,135 A | 5/1973 | Ernst et al. | |
| 3,761,335 A | 9/1973 | Cichoski et al. | |
| 3,853,680 A | 12/1974 | Daniel | |
| 3,894,407 A | 7/1975 | Clingan et al. | |
| 3,894,409 A | 7/1975 | Clingan et al. | |
| 3,896,637 A | 7/1975 | Thore | |
| 3,905,853 A | 9/1975 | Stent | |
| 3,960,624 A | 6/1976 | Erlandson | |
| 4,010,054 A | 3/1977 | Bradt | |
| 4,078,957 A | 3/1978 | Bradt | |
| 4,112,565 A | 9/1978 | Sailas | |
| 4,191,792 A | 3/1980 | Janssen | |
| 4,192,697 A | 3/1980 | Parker et al. | |
| 4,236,286 A | 12/1980 | Abler et al. | |
| 4,245,487 A | 1/1981 | Schaab et al. | |
| 4,378,267 A | 3/1983 | Saito | |
| 4,395,869 A | 8/1983 | Priaroggia et al. | |
| 4,415,611 A | 11/1983 | Yamagata et al. | |
| 4,466,151 A | 8/1984 | Barch et al. | |
| 4,513,042 A | 4/1985 | Lumb | |
| 4,532,780 A | 8/1985 | Tilson et al. | |
| 4,546,020 A | 10/1985 | Sakai et al. | |
| 4,592,213 A | 6/1986 | Tilson et al. | |
| 4,692,975 A | 9/1987 | Garcia | |
| 4,798,748 A | 1/1989 | Kitamura et al. | |
| 5,051,586 A | 9/1991 | Sabreen | |
| 5,108,780 A | 4/1992 | Pitt et al. | |
| 5,137,595 A | 8/1992 | Garcia | |
| 5,195,242 A | 3/1993 | Sekar | |
| 5,206,968 A | 5/1993 | Bower et al. | |
| 5,273,604 A | 12/1993 | Alvarez Garcia | |
| 5,294,276 A | 3/1994 | Linn et al. | |
| 5,339,484 A | 8/1994 | Polzin et al. | |
| 5,397,414 A | 3/1995 | Garcia et al. | |
| 5,398,409 A | 3/1995 | Sekar | |
| 5,431,029 A | 7/1995 | Kuhrau et al. | |
| 5,468,207 A | 11/1995 | Bower et al. | |
| 5,537,745 A * | 7/1996 | Musch et al. | 29/895.211 |
| 5,546,768 A | 8/1996 | Kuhrau et al. | |
| 5,572,790 A | 11/1996 | Sekar | |
| 5,577,402 A | 11/1996 | Kuhrau et al. | |
| 5,614,047 A | 3/1997 | Garcia | |
| RE35,526 E | 6/1997 | Alvarez Garcia | |
| 5,685,176 A | 11/1997 | Kuhrau et al. | |
| 5,694,688 A | 12/1997 | Musch et al. | |
| 5,759,329 A | 6/1998 | Krause et al. | |
| 5,855,715 A | 1/1999 | Langford et al. | |
| 5,862,591 A | 1/1999 | Kulkaski | |
| 5,874,032 A | 2/1999 | Zdrahala et al. | |
| 6,016,670 A | 1/2000 | Kuhrau et al. | |
| 6,019,934 A | 2/2000 | Schulte | |
| 6,145,196 A | 11/2000 | Ripstein | |
| 6,151,920 A | 11/2000 | Schindler et al. | |
| 6,159,134 A * | 12/2000 | Sekar | 492/13 |
| 6,159,320 A | 12/2000 | Tams et al. | |
| 6,203,648 B1 | 3/2001 | Barton et al. | |
| 6,254,710 B1 | 7/2001 | Sekar | |
| 6,324,717 B1 | 12/2001 | Sekar | |
| 6,502,779 B1 | 1/2003 | Jelinek et al. | |
| 6,615,490 B2 | 9/2003 | Polzin | |
| 6,660,118 B2 * | 12/2003 | Tams et al. | 156/187 |
| 6,685,121 B1 | 2/2004 | Jelinek et al. | |
| 6,766,668 B2 | 7/2004 | Sinykin | |
| 6,902,131 B1 | 6/2005 | Jelinek et al. | |
| 6,918,552 B2 | 7/2005 | Jelinek et al. | |
| 6,929,203 B1 | 8/2005 | Jelinek et al. | |
| 6,993,941 B2 | 2/2006 | Yamaguchi | |
| 2001/0036513 A1 * | 11/2001 | Capoccia | 427/429 |
| 2002/0042331 A1 * | 4/2002 | Fortner et al. | 492/13 |
| 2002/0091051 A1 | 7/2002 | Sekar | |
| 2002/0104358 A1 | 8/2002 | Hart | |
| 2002/0112810 A1 | 8/2002 | Polzin et al. | |
| 2003/0213083 A1 | 11/2003 | Yamaguchi | |
| 2007/0056132 A1 * | 3/2007 | Yamaguchi et al. | 15/230 |

FOREIGN PATENT DOCUMENTS

| | | |
|---|---|---|
| KR | 1020010074645 A | 8/2001 |

* cited by examiner

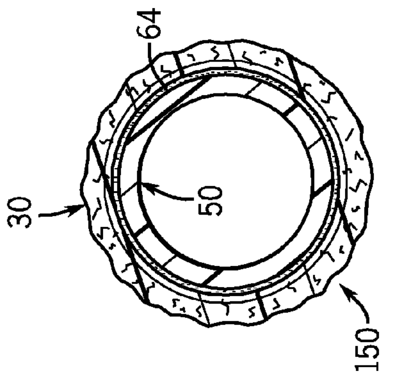
FIG. 10
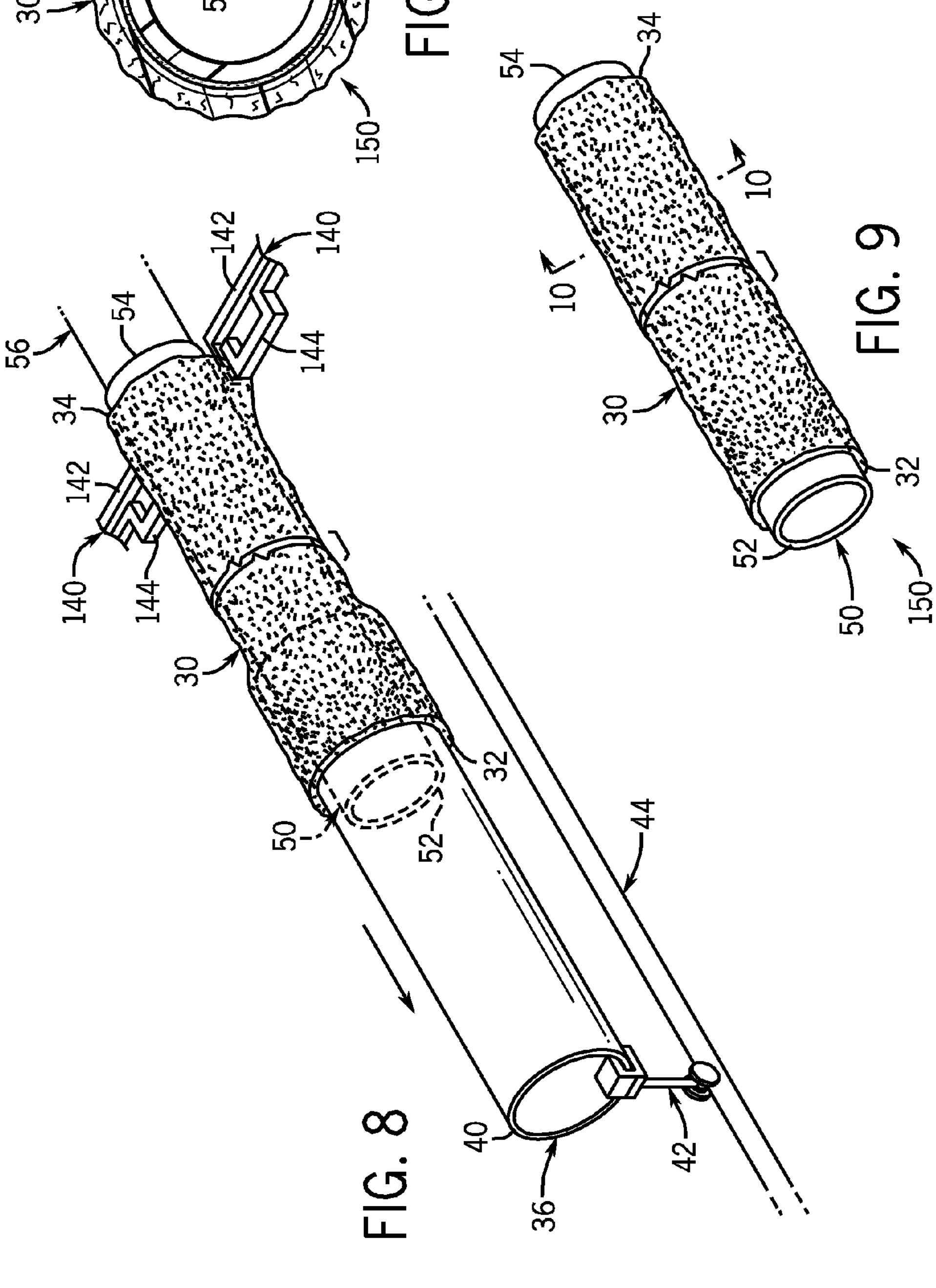
FIG. 8
FIG. 9

METHOD OF MANUFACTURING PAINT ROLLER COVERS FROM A TUBULAR FABRIC SLEEVE

IDENTIFICATION OF RELATED APPLICATION

This patent application is a continuation-in-part of U.S. patent application Ser. No. 11/740,119, filed on Apr. 25, 2007, entitled "Tubular Sliver Knit Fabric for Paint Roller Covers," now U.S. Pat. No. 7,503,191 which patent application is assigned to the assignee of the present invention, and which patent application is hereby incorporated herein by reference in its entirety.

BACKGROUND OF THE INVENTION

Field of the Invention

The present invention relates generally to the manufacture of paint roller covers, and more particularly to a method of manufacturing paint roller covers from a seamless, tubular fabric sleeve that is installed onto a hollow, cylindrical paint roller core member.

The two inventions which have had the greatest impact on paint application are the invention of the paint roller in the 1930's and the development of water-based paint in the late 1940's. While water-based paints are easy to mix, apply, and clean up, there is little doubt that the paint roller has been the greatest single time saving factor in the paint application process, allowing large surfaces to be painted with a uniform coat of paint quickly and easily. Typically, paint rollers are comprised of two components, namely a handle assembly and a paint roller cover for installation onto the handle assembly.

The handle assembly consists of a grip member having a generally L-shaped metal frame extending therefrom, with the free end of the metal frame having a rotatable support for a paint roller cover mounted thereon. The paint roller cover consists of a thin, hollow cylindrical core which fits upon the rotatable support of the handle, with a plush pile fabric being secured to the outer diameter of the paint roller cover. The core may be made of either cardboard or plastic material, with which material is used for the core generally being determined based upon the selling price of the paint roller cover. The pile fabric is traditionally applied as a strip which is helically wound onto the outer surface of the core with adjacent windings of the fabric strip being located close adjacent each other to provide the appearance of a single continuous pile fabric covering on the core.

Typically, the pile fabric is a dense knitted pile fabric, which may be knitted from natural fibers such as wool or mohair, synthetic fibers such as polyester, acrylic, nylon, or rayon, or from a blend of natural and synthetic fibers. The knitting is typically performed on a circular sliver knitting machine, which produces a tubular knitted base material with a knit-in pile in tubular segments which are approximately fifty-eight inches in circumference by thirty to fifty yards long (depending on fabric weight).

Generally, sliver knitting is a knitting process which locks individual pile fibers directly into a lightweight knit backing or base material in a manner wherein the pile fibers extend from one side of the knit base material. The knit base material itself is made from yarn, which may be knit in a single jersey circular knitting process on a circular knitting machine, with closely packed U-shaped tufts of the fibers being woven into the knit base material which anchors them in the completed pile fabric. The free ends of the fibers extend from one side of the knit base material to provide a deep pile face. The knit base material is typically made of synthetic yarns, with the pile being made of a desired natural or synthetic fiber, or a blend of different fibers.

Such fabrics are illustrated, for example, in U.S. Pat. No. 1,791,741, to Moore, U.S. Pat. No. 2,737,702, to Schmidt et al., U.S. Pat. No. 3,226,952, to Cassady, U.S. Pat. No. 3,853,680, to Daniel, U.S. Pat. No. 3,894,409, to Clingan et al., U.S. Pat. No. 4,236,286, to Abler et al., U.S. Pat. No. 4,513,042, to Lumb, and U.S. Pat. No. 6,766,668, to Sinykin, all of which patents are hereby incorporated herein by reference. Sliver knit high pile fabrics have been widely used for many years in the manufacture of imitation fur fabrics, and also have found use, for example, as linings for overcoats and footwear, as coverings for stuffed toys and floors, in applications in pet beds, case liners, boot and slipper liners, medical pads, and blankets, and, of course, as coverings for paint roller covers.

The components of the knitted fabric are a yarn, which is used to knit the fabric's knit base material, and fibers which are supplied in a "sliver" rope, which consists of fibers which are all longitudinally oriented in a rope which is typically less than three inches in diameter. The fibers are loose fibers of either a single type or a uniform blend of multiple types of fibers. The fiber mix will determine the performance, density, texture, weight, patterning, and color of the finished pile fabric.

The fibers are typically blown together in an air chamber to blend them, and then are carded in carding machines that "comb" the fibers to align them in parallel with each other. The fibers are then gathered into a soft, thick rope which is called "sliver" (which is the derivation for the term "sliver knit") or "roving." The yarn and the sliver are supplied to the circular knitting machine, which typically has eighteen heads and produces a tubular knit pile fabric which is approximately fifty-eight inches in circumference. (Thus, when the tubular knit pile fabric is slit longitudinally, the fabric is approximately fifty-eight inches wide.)

Such knitting machines are well known in the art, and are illustrated in U.S. Pat. No. 3,894,407, to Clingan et al., U.S. Pat. No. 3,896,637, to Thore, U.S. Pat. Nos. 4,532,780 and 4,592,213, both to Tilson et al., U.S. Pat. Nos. 5,431,029, 5,546,768, 5,577,402, 5,685,176, and 6,016,670, all to Kukrau et al., and U.S. Pat. No. 6,151,920, to Schindler et al., all of which patents are hereby incorporated herein by reference. Examples of commercial versions of such knitting machines are the Model SK-18 II Sliver Knitter and the Model SK-18J II Sliver Knitter which are available from Mayer Industries, Inc. of Orangeburg, S.C.

The first commercial circular sliver knitting machine had seven heads, and commercially-available circular knitting machines today have between seven and eighteen heads. Eighteen head knitting machines have upwards of one thousand needles, and produce tubular knitted segments that are approximately nineteen inches in diameter (fifty-eight inches in circumference). All of these circular sliver knitting machines produce tubular knitted pile fabric segments having the pile located on the inside. Such circular sliver knitting machines are incapable of either producing tubular knitted pile fabric segments having the pile on the outside or small diameter tubular knitted pile fabric segments.

Following the manufacture of the tubular knitted pile segments on a circular sliver knitting machine, the tubular knitted pile segments are slit longitudinally to produce extended knitted pile segments of fabric which are typically fifty-eight inches wide by thirty to fifty yards long. These extended knitted pile segments of fabric are then tensioned longitudinally and transversely, stretched to a sixty inch width or greater to guarantee the proper number of two and seven-eighth inch strips, and back coated (on the non-pile side of the knit base material) with a stabilized coating composition such as a clear acrylic polymer. The coating composition which is coated onto the non-pile side of the knit base material is then processed, typically by heat, to stabilize the coated, extended knitted pile segment. The heating operation dries and bonds the coating composition to the knit base material, producing a fabric which is essentially lint-free.

The coated, extended knitted pile segment can then be subjected to a shearing operation to achieve a uniform pile length, with the sheared fibers being removed by vacuum, electrostatically, or by any other known removal technique. The pile density, the nap length, and the stiffness of the fibers are varied based upon custom specifications and the particular characteristics of the paint roller cover that are desired.

The sheared, coated, extended knitted pile segment is then slit into a plurality of two and seven-eighths inch wide knitted pile fabric strips, of which there are typically twenty for a sixty inch wide fabric segment. Following this slitting operation, the strips must be vacuumed to remove stray fibers and lint. The knitted pile fabric strips are rolled onto a core to produce twenty rolls of knitted pile fabric strips, each of which is thirty to fifty yards long. These rolls of knitted pile fabric strips may then be shipped to a paint roller cover manufacturer. Alternately, a plurality of standard lengths of the fabric may be seamed together to produce an extended length fabric strip which may be helically wound in consecutive rows upon a core as taught in U.S. Pat. No. 6,502,779, U.S. Pat. No. 6,685,121, U.S. Pat. No. 6,902,131, U.S. Pat. No. 6,918,552, and U.S. Pat. No. 6,929,203, all to Jelinek et al., all of which patents are hereby incorporated herein by reference.

Both the standard length rolls of knitted pile fabric strips and the rolls of extended length knitted pile fabric strips have substantial material costs and labor costs that are incurred in the manufacturing process after the circular knitting process. The material costs include the cost of the coating material, losses due to fly (fly are extra fibers that come loose from the knitted pile fabric), losses during the cutting of the sixty inch wide fabric segment into twenty knitted pile fabric strips, and seam losses throughout the operation. The labor costs include the costs to perform the coating process, the brushing, the second pass shearing, and all of the finishing steps within the traditional sliver knit operation including slitting and continuously coiling the fabric slits.

Paint roller covers are manufactured by using a hollow cylindrical core made of cardboard or thermoplastic material which has the knitted pile fabric strip helically wound around the core. During the manufacture of paint roller covers, the knitted pile fabric strips are secured to the core either by using adhesive or epoxy, or by thermally bonding the knitted pile fabric strip in place on a thermoplastic core. For examples of these manufacturing processes see U.S. Pat. No. 4,692,975, to Garcia (the "'975 patent"), U.S. Pat. No. 5,572,790, to Sekar (the "'790 patent"), and U.S. Pat. No. 6,159,320, to Tams et al. (the "'320 patent"), each of which are hereby incorporated by reference.

The '975 patent uses a core that is cut from preformed thermoplastic (e.g., polypropylene) tubular stock. The core is mounted on a rotating spindle, and a movable carriage mounted at an angle to the spindle feeds a continuous strip of knitted pile fabric onto the core, with the carriage moving parallel to the spindle in timed relation to its rotation so that the knitted pile fabric strip is wound on the plastic core in a tight helix. Also mounted to the movable carriage is a heat source for heat softening the thermoplastic core just in advance of the point where the knitted pile fabric strip is applied to the thermoplastic core, such that the knitted pile fabric is heat bonded to the thermoplastic core as it is wound thereon. The bond formed between the knitted pile fabric and the thermoplastic core is a strong one not subject to separation from exposure to paint solvents.

The '790 patent uses a core that is formed from a strip (or multiple strips) of thermoplastic material that is (are) helically wound about a stationary mandrill. Alternately, the core may be formed by applying liquefied thermoplastic material to a drive belt which transfers the thermoplastic material to the mandrill. A layer of adhesive is then applied to the outer surface of the core, and the knitted pile fabric strip is applied to the core by helically winding the knitted pile fabric strip onto the core. Alternately, the paint roller cover may instead be made by bonding, in a single step, a knitted pile fabric strip to a wound strip of thermoplastic material that is wrapped about the mandrill.

The '320 patent extrudes a cylindrical plastic core through a rotating extruder head that is cooled, with the outer surface of the core then being plasma treated. The knitted pile fabric strip is secured onto the plasma treated outer surface of the core by extruding thin films of first and second epoxy resin subcomponents onto the outer surface of the core as it is extruded, cooled, and plasma treated in a continuous process.

Other variations are also known, particularly in technologies relating to manufacturing pile fabric suitable for use on paint roller covers. For example, instead of using knitted pile fabric, woven pile fabric can be substituted. Woven pile fabric consists of three yarns—a knit base material or warp yarn, a filling or weft yarn, and a pile yarn. The threads of warp yarn are held taut and in a parallel array on a loom, and the threads of weft yarn are woven across the threads of warp yarn in an over/under sequence orthogonal to the threads of warp yarn, with threads of pile yarn being woven into the weave of warp and weft yarns such that the threads of pile yarn extend essentially perpendicularly from one side of the fabric. Such woven pile fabric may be processed in a manner similar to that described above with regard to the processing of knitted pile segments of fabric to produce strips of woven pile fabric that can be helically wound onto paint roller cover cores.

However, all paint roller covers manufactured using the methods described above have a seam. As the strips of fabric are helically wound around the cores, the fabric strips wrap contiguously around the core, thereby creating a helical seam that is located throughout the cover. The seam inevitably produces a less than optimal paint roller cover since a seam can interfere with the uniform application of paint from the paint roller cover. The helical winding process of manufacturing a paint roller cover requires careful attention to contiguous winding. Errors resulting in overlapped fabric or gaps in the contiguous winding process often occur, resulting in increased scrap or marketing poor quality covers. Such seams have the potential, particularly with short nap paint roller covers, to produce a seam mark or stippling effect on the surface being painted, particularly if the paint being applied combines with the seams to produce a more pronounced defective characteristic in the surface being painted.

An examination of prior technology in the paint roller cover arts reveals that this problem has been recognized in the past, with several solutions that have been proposed to deal with the challenge presented by the presence of seams in paint roller covers. The first of these, U.S. Pat. No. 2,600,955, to Barnes et al., which patent is hereby incorporated herein by reference, discloses a paint roller cover made from a segment of canvas tubing that has yarn loops sewn therethrough, with the ends of the loops on the outside of the segment of the canvas tubing being cut. This approach is certainly far too expensive to represent a viable solution, and would not compare well to currently commercially available paint roller covers in the quality of the paint coat that could be applied.

Another approach is shown in U.S. Pat. No. 2,920,372, U.S. Pat. No. 2,944,588, and U.S. Pat. No. 3,010,867, all to Sannipoli et al., which patents are hereby incorporated herein by reference, which patents are related and disclose the use of a tubular knitted pile fabric manufactured on an apparatus disclosed in U.S. Pat. No. 1,849,466, to Moore, which patent is hereby incorporated herein by reference. The apparatus disclosed in Moore, which is hand operated, was stated in the Sannipoli et al. patents to be capable of manufacturing a seamless tubular knitted sleeve in which the pile is located on the interior of the sleeve, thereby requiring that the sleeve be inverted prior to mounting it on a core to form a paint roller cover. As such, the apparatus disclosed in Moore is incapable of manufacturing a knitted sleeve in which the pile is located on the exterior of the sleeve.

The Sannipoli et al. patents invert the tubular knitted sleeve by positioning it within a hollow tube and pulling one end of the tubular knitted sleeve around the end of the tube and pushing successive portions of the tubular knitted sleeve along the outside of the tube. When the fabric is inverted, the material of the fabric is deformed due to stretching that occurs during the process of inverting the tubular knitted sleeve. This deformation tends to increase the diameter of the tubular knitted sleeve, thus requiring it to be stretched lengthwise to restore it to its former diameter. Not only is this process difficult and expensive, but it also results in variable density of the fabric as well as introducing the prospect of adhesive or thermoplastic bleed-through within the stitches. Such problems will result in unacceptable product quality in paint roller covers made from this type of fabric.

It has been determined that the Sannipoli et al. method has three drawbacks that make it impracticable. The first drawback of the Sannipoli et al. method is that it requires a high degree of manual operation in that it requires cutting of the tubular knitted sleeves to size and placement of the tubular knitted sleeves into the tubes of the inverting machine. The second drawback of the Sannipoli et al. method is that only relatively short length tubular knitted sleeves representing a single paint roller cover (typically nine inches) can be processed at a time, which makes the method inherently unsuitable for mass production.

The third, and by far the most serious, drawback of the Sannipoli et al. method is that the process of inverting the tubular knitted sleeves inevitably results in stretching the tubular knitted sleeves so that they will not snugly fit on the paint roller cover cores, potentially creating creases in a high percentage of them when they are adhesively secured to the paint roller cover cores. This results in an unacceptably high percentage of them being defective and necessitating them being scrapped, resulting in an unacceptably high scrap cost. Predictably, the method taught in the Sannipoli et al. patents has never found commercial acceptance due to these serious disadvantages.

The above-incorporated by reference U.S. patent application Ser. No. 11/740,119 discloses a tubular knitted pile fabric which is manufactured with the pile side facing outwardly rather than inwardly and with a diameter suitable for mounting on a paint roller cover core in a seamless manner. While the tubular knitted pile fabric in this patent application is disclosed as being for installation onto a core member, the method used to install the tubular knitted pile fabric onto the outer surface of the core member is not disclosed. As such, it will be appreciated by those skilled in the art that the prior art does not teach or suggest any method by which a tubular pile fabric may be installed onto a core member having an adhesive outer surface.

It is accordingly apparent that it is desirable to provide a method by which a tubular pile fabric may be installed onto the outer surface of a core member. It is highly desirable that the installation method permanently secure the tubular pile fabric to the core member in a manner whereby the tubular pile fabric closely conforms to the outer surface of the core member. In order to facilitate the mass manufacture of paint roller covers, it is also desirable that the method facilitate the installation of an extended length segment of the tubular pile fabric onto an extended length core member, which can be cut into segments of any desired size after the installation of the tubular pile fabric onto the core member.

It is desirable that the tubular pile fabric, which is manufactured with the pile side out, need not be inverted during the process of installing it onto the core member. It is further desirable that the knitted pile fabric need not be excessively stretched during its installation onto the core member to ensure that when the tubular pile fabric is secured to the core member it will not have any wrinkles or other surface defects therein. It is also desirable that any of a wide variety of different technologies can be used both to manufacture the core member and to secure the knitted pile fabric to the core member.

The method used to install the tubular pile fabric onto the outer surface of a core member must result in a construction which is both durable and long lasting, and which, when installed, should yield a paint roller cover of superior quality in which the fabric is permanently fixed to the paint roller cover core. In order to enhance the market appeal of the method of the present invention, it should also minimize the cost of manufacture of paint roller covers when compared to conventional methods of manufacturing paint roller covers to thereby afford it the broadest possible market. Finally, it is also desirable that all of the aforesaid advantages and aspirations of the paint roller cover manufacturing method of the present invention be achieved without incurring any substantial relative disadvantage.

SUMMARY OF THE INVENTION

The disadvantages and limitations of the background art discussed above are overcome by the present invention. With this invention, a method of manufacturing paint roller covers is provided which installs a tubular knitted pile fabric segment onto a core member. The method can be used either to manufacture a single paint roller cover at a time (single paint roller cover length is typically seven or nine inches (one hundred seventy-eight millimeters or two hundred twenty-nine millimeters, respectively)), or, preferably, to manufacture a pile fabric covered core assembly that can be cut into a plurality of the unfinished paint roller covers which are then finished (such as sixty-four inches (one thousand six hundred twenty-five millimeters), which may be cut to produce seven nine inch paint roller covers or nine seven inch paint roller covers) The tubular knitted pile fabric segment is provided with its pile side out in a size in which its interior diameter is approximately the same size as or slightly smaller than the outer diameter of a core member onto which it is to be installed (paint roller cover cores typically have an inner diameter of approximately one and one-half inches (thirty-eight millimeters) and an outer diameter of approximately one and five-eighths inches (forty-one millimeters) to one and three-quarters inches (forty-four millimeters)).

The tubular knitted pile fabric segment is provided in the desired length and is installed onto the outside of a hollow mounting tube having an inner diameter which is larger than the outer diameter of the core member. In placing the tubular knitted pile fabric onto the mounting tube, it is typically stretched, but it is sufficiently resilient to shrink back to a size that is approximately the same as its original size.

The core member may be made according to any of a variety of ways, including being molded out of a thermoplastic material or manufactured out of a cardboard material, being made from helically wound strip(s) of thermoplastic material that is (are) formed around a mandrill, or being extruded from an extruder having a rotating extruder head and cooled. An adhesive bonding layer is provided on the outside of the core member. The adhesive bonding layer may be provided by the application of an adhesive or an epoxy (if epoxy is used, the outer surface of the core member is preferably plasma treated prior to application of the epoxy) to the outer surface of the core member, or by heating the outer surface of the core member to partially melt the outer surface thereof.

The core member with the adhesive bonding layer disposed on the outer surface thereof is then inserted into the interior of the mounting tube. It will be appreciated that the inner diameter of the mounting tube is sufficiently large so that when the core member with the adhesive bonding layer disposed on the outer surface thereof is inserted into the mounting tube the adhesive bonding layer will not come into contact with the interior of the mounting tube.

The mounting tube is then withdrawn from the tubular knitted pile fabric segment while maintaining the tubular knitted pile fabric segment and the core member stationary with respect to each other. As the mounting tube is withdrawn from the tubular knitted pile fabric segment, the tubular knitted pile fabric segment shrinks to conform to the adhesive bonding layer-coated outer surface of the core member, thereby forming a pile fabric covered core assembly. Thus, the tubular knitted pile fabric segment becomes secured to the outer surface of the core member by the adhesive bonding layer.

The pile fabric covered core assembly is finished by cutting it into a plurality of unfinished paint roller covers which may then be finished. The pile fabric is combed and sheared to the desired length, either before cutting the pile fabric covered core assembly or after cutting it into the unfinished paint roller covers. Finally, the edges of the unfinished paint roller covers are beveled, and any loose sliver fibers are then vacuumed off. The finishing of the pile fabric covered core assembly may be performed using the MBK Maschinenbau GmbH paint roller cover finishing machine, an Edward Jackson (Engineer) Limited finishing machine, or other equipment custom built by individual paint roller cover manufacturers.

It may therefore be seen that the present invention teaches a method by which a tubular pile fabric may be installed onto the outer surface of a core member. The paint roller cover manufacturing method of the present invention permanently secures the tubular pile fabric to the core member in a manner whereby the tubular pile fabric closely conforms to the outer surface of the core member. In order to facilitate the mass manufacture of paint roller covers, the paint roller cover manufacturing method of the present invention facilitates the installation of an extended length segment of the tubular pile fabric onto an extended length core member, which can be cut into segments of any desired size after the installation of the tubular pile fabric onto the core member.

The tubular pile fabric, which is manufactured with the pile side out, need not be inverted during the process of installing it onto the core member. Further, the knitted pile fabric need not be excessively stretched during its installation onto the core member, thereby ensuring that when the knitted pile fabric is secured to the core member it will not have any wrinkles or other surface defects therein. Additionally, any of a wide variety of different technologies can be used both to manufacture the core member and to secure the knitted pile fabric to the core member.

The method used to install the tubular pile fabric onto the outer surface of a core member results in a construction which is both durable and long lasting, and which, when installed, yields a paint roller cover of superior quality in which the fabric is permanently fixed to the paint roller cover core. The method of the present invention minimizes the cost of manufacture of paint roller covers when compared to conventional methods of manufacturing paint roller covers to thereby enhance its market appeal and afford it the broadest possible market. Finally, all of the aforesaid advantages and aspirations of the paint roller cover manufacturing method of the present invention are achieved without incurring any substantial relative disadvantage.

DESCRIPTION OF THE DRAWINGS

These and other advantages of the present invention are best understood with reference to the drawings, in which:

FIG. 8 is a schematic isometric depiction of the elements shown in FIGS. 5 and 7, with the core continuing to be withdrawn from the outer surface of the mounting tube as the tubular paint roller cover fabric continues to be pulled off of the outer surface of the mounting tube and onto the adhesive outer surface of the core;

FIG. 9 is a schematic isometric depiction showing the tubular paint roller cover fabric and the core shown in FIGS. 5, 7, and 8, with the tubular paint roller cover fabric now covering and adhesively secured to substantially the entire outer surface of the core;

FIG. 10 is a cross-sectional depiction of the tubular paint roller cover fabric-covered core shown in FIG. 9;

DETAILED DESCRIPTION OF THE EXEMPLARY EMBODIMENTS

An exemplary embodiment is discussed herein, it being understood that one skilled in the art could make any of a number of changes, modifications, variations, or alterations to the exemplary embodiment as described herein without departing from the spirit or scope of the present invention. The exemplary embodiment utilizes the tubular knitted pile fabric disclosed in the above-incorporated by reference U.S. patent application Ser. No. 11/740,119, which discloses the tubular knitted pile fabric manufactured with the pile side facing outwardly and with a diameter suitable for mounting on a paint roller cover core. The exemplary embodiment taught herein discloses how the tubular knitted pile fabric is installed and affixed onto a core, following which the tubular knitted pile fabric-covered core may be cut into multiple paint roller-cover size core member segments which are subsequently finished in conventional fashion.

Figures 1, 2, 3:
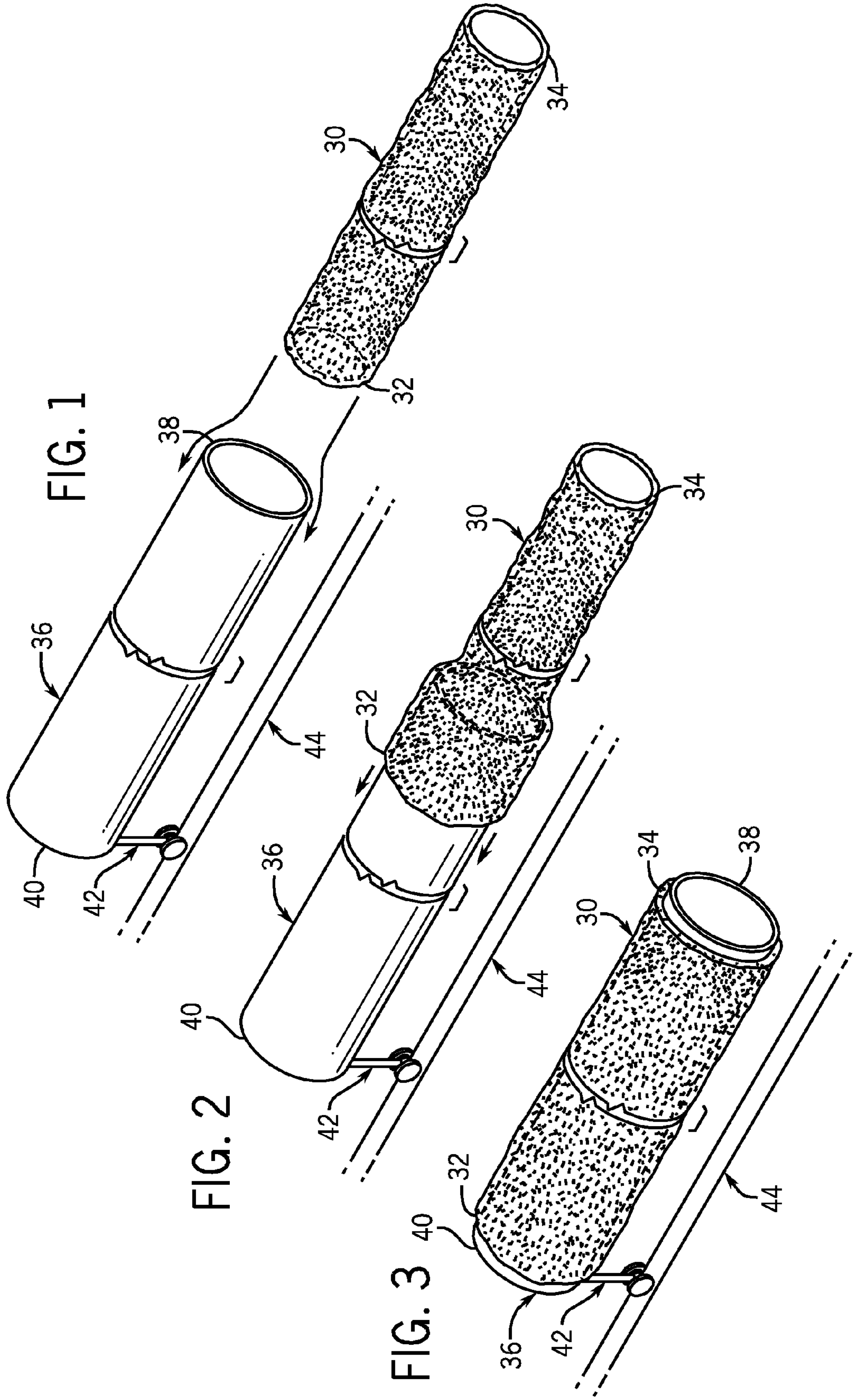
FIG. 1 is a schematic isometric depiction showing a segment of tubular paint roller cover fabric having an end thereof located adjacent to an end of a thin, hollow, longitudinally moveable mounting tube.
FIG. 2 is a schematic isometric depiction showing the segment of tubular paint roller cover fabric shown in FIG. 1 as it is being pulled onto the outer surface of the mounting tube shown in FIG. 1.
FIG. 3 is a schematic isometric depiction showing the segment of tubular paint roller cover fabric shown in FIGS. 1 and 2 located on the outer surface of the mounting tube shown in FIGS. 1 and 2.

Referring first to FIG. 1, a segment of tubular knitted pile fabric 30 having a first end 32 and a second end 34 is shown as it is about to be pulled onto the exterior surface of a thin, hollow, longitudinally moveable mounting tube 36 having a first end 38 and a second end 40. The tubular knitted pile fabric 30 has an inner diameter that is approximately the same size as or slightly smaller than the outer diameter of a paint roller cover core (not shown in FIG. 1) upon which it will ultimately be installed, which outer diameter is typically approximately one and five-eighths inches (forty-one millimeters) to one and three-quarters inches (forty-four millimeters) (the inner diameter of a paint roller cover core is approximately one and one-half inches (thirty-eight millimeters)).

For purposes of the example discussed herein, it will be assumed that the tubular knitted pile fabric 30 is approximately sixty-four inches (one thousand six hundred twenty-five millimeters) long, which is a sufficient length to allow the tubular knitted pile fabric 30 to be used for the manufacture of seven nine-inch long paint roller covers. It will be appreciated by those skilled in the art that the tubular knitted pile fabric 30 could alternately be sized for use in manufacturing a single paint roller cover (nine-inches long or any other desired length as well), or for manufacturing any of several different numbers of paint roller covers of any of several different lengths.

Also for purposes of the example discussed herein, it will be assumed that the outer diameter of the paint roller cover core (not shown in FIG. 1) is approximately one and five-eighths inches (forty-one millimeters) and that the inner diameter of the tubular knitted pile fabric 30 is approximately one and one-half inches (thirty-eight millimeters). Since the inner diameter of the mounting tube 36 needs to be sufficiently large to admit the paint roller cover core (which will have an adhesive bonding material disposed on the outer surface thereof as will become evident below in conjunction with the discussion of FIGS. 4 through 10), for purposes of the example discussed herein, it will be assumed that the inner diameter of the mounting tube 36 is approximately one and seven-eighths inches (forty-eight millimeters) and the outer diameter of the mounting tube 36 is approximately two inches (fifty-one millimeters). For the sixty-four inch long tubular knitted pile fabric 30, it will be appreciated that the mounting tube 36 will need to be sufficiently long to accommodate this length of tubular knitted pile fabric 30 (or any other desired length).

It may be seen that the mounting tube 36 is shown as being supported by a schematically-depicted support apparatus 42 which is supported for longitudinal movement on a support track 44. The mounting tube 36 is supported by the support apparatus 42 in a parallel, spaced away relationship with the support track 44, with the mounting tube 36 being moveable in a direction coinciding with the longitudinal axis of the mounting tube 36.

In FIG. 1, the tubular knitted pile fabric 30 is shown with its first end 32 about to be pulled over the first end 38 of the mounting tube 36 of the mounting tube 36. Since the inner diameter of the tubular knitted pile fabric 30 in the example presented herein is smaller than the outer diameter of the mounting tube 36 in the example presented herein, it will be appreciated by those skilled in the art that the tubular knitted pile fabric 30 will be stretched as it is pulled onto the outside of the mounting tube 36. FIG. 2 shows the tubular knitted pile fabric 30 partly pulled onto the mounting tube 36, and FIG. 3 shows the tubular knitted pile fabric 30 fully pulled onto the mounting tube 36, with the first end 32 of the tubular knitted pile fabric 30 located adjacent to the second end 40 of the mounting tube 36, and with the second end 34 of the tubular knitted pile fabric 30 located close adjacent to the first end 38 of the mounting tube 36.

Since the outer diameter of the mounting tube 36 is larger than the inner diameter of the tubular knitted pile fabric 30, the tubular knitted pile fabric 30 must be manufactured in a manner whereby it is capable of stretching when it is pulled onto the mounting tube 36, and subsequently resiliently shrinking to its former size (or close thereto) when the tubular knitted pile fabric 30 is removed from the mounting tube 36 and installed onto a paint roller cover core (not shown in FIGS. 1 through 3). Alternately, the tubular knitted pile fabric 30 could also be manufactured from a material that is capable of being shrunk onto a paint roller cover core, for example through the application of heat to the tubular knitted pile fabric 30 after it has been so installed. The tubular knitted pile fabric 30 taught in the above-incorporated by reference U.S. patent application Ser. No. 11/740,119 is resilient when stretched and will shrink to fit the outer diameter of a paint roller cover core.

FIGS. 4A through 4D schematically illustrate four different methods of providing for the affixing the tubular knitted pile fabric 30 onto paint roller cover cores, each of which methods will use a common method for installing the tubular knitted pile fabric 30 onto an extended length segment of paint roller cover core material (which will be discussed below in conjunction with FIGS. 5 through 10). In each of these four methods shown in FIGS. 4A through 4D, an extended length segment of paint roller cover core material will be provided with an adhesive bonding material disposed on the outer surface thereof. Both the methods by which the extended length segment of paint roller cover core material are provided and the methods by which the extended length segment of paint roller cover core material is provided with an adhesive bonding material disposed on the outer surface thereof are varied in FIGS. 4A through 4D.

Figures 4A, 4B:
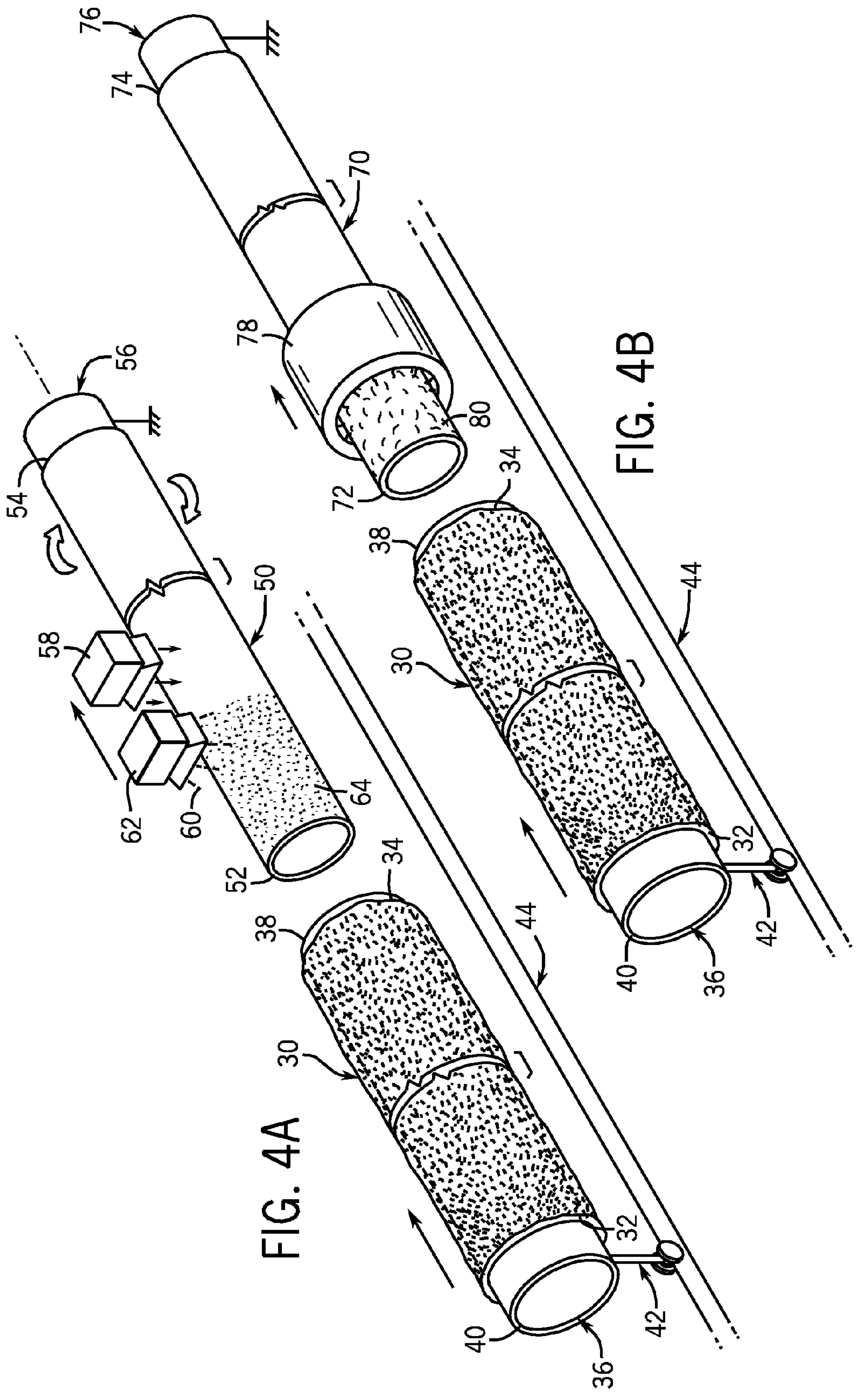
FIG. 4A is a schematic isometric depiction showing the segment of the mounting tube with the tubular paint roller cover fabric thereupon shown in FIG. 3 located adjacent to a hollow, cylindrical plastic core that is having its outer surface plasma treated and epoxy coated to produce an adhesive outer surface on the core.
FIG. 4B is a schematic isometric depiction showing the segment of the mounting tube with the tubular paint roller cover fabric thereupon shown in FIG. 3 located adjacent to a hollow, cylindrical thermoplastic core that is having its outer surface softened by a heater to produce an adhesive outer surface on the core.

Referring first to FIG. 4A, the tubular knitted pile fabric 30 is to be affixed onto a length of plastic tubular core stock 50 having a first end 52 and a second end 54 using an adhesive such as an epoxy. The plastic tubular core stock 50 may be made of polypropylene or any other suitable material having the desired characteristics (including, for example, a paper or cardboard core), and is shown as being removably mounted onto a core support member 52 which is schematically illustrated as being in a fixed position to support the plastic tubular core stock 50 in coaxial alignment with the mounting tube 36.

In the exemplary embodiment illustrated in FIG. 4A, the external surface of the plastic tubular core stock 50 is treated with high voltage electrical plasma by a surface treater 58 in order to cause the outer surface of the plastic tubular core stock 50 to attract and accommodate adhesive. (It should be noted that if a paper or cardboard core is used instead of plastic, treatment by the surface treater 58 will not be required.) A thin layer of epoxy 60 or some other suitable adhesive is applied to the outer surface of the plastic tubular core stock 50 by an epoxy extrusion unit 62 or any other suitable mechanism. The epoxy 60 may be, for example, any of the adhesive resins sold under the trademarks MASTER-GRIP 5200, 5300, or 5408, which are available from Fielco Industries of Huntingdon Valley, Pa.

In this manner, the outer surface of the plastic tubular core stock 50 will be coated with the epoxy 60 such that when the tubular knitted pile fabric 30 is placed upon the epoxy-coated outer surface 64 of the plastic tubular core stock 50, the tubular knitted pile fabric 30 will become adhesively secured onto the plastic tubular core stock 50. Thus, the tubular knitted pile fabric 30 and the plastic tubular core stock 50 will become an integral unitary extended length paint roller cover assembly. The epoxy 60 will also act to retain the pile fibers on the tubular knitted pile fabric 30.

Referring next to FIG. 4B, the tubular knitted pile fabric 30 is to be affixed onto a length of plastic tubular core stock 70 having a first end 72 and a second end 74 using a heat fusing technique rather than an adhesive. The plastic tubular core stock 70 may be made of polypropylene or any other suitable thermoplastic material having the desired heat-bonding characteristics, and is shown as being removably mounted onto a core support member 76, which, like the core support member 56 in FIG. 4A, is schematically illustrated as being in a fixed position to support the plastic tubular core stock 70 in coaxial alignment with the mounting tube 36.

A heat source 78 is positioned to soften the outer surface of the plastic tubular core stock 70 before the tubular knitted pile fabric 30 is mounted on the plastic tubular core stock 70, with the heat-softened outer surface 80 being ready to receive the tubular knitted pile fabric 30. The heat source 78 may be more elongated in the direction of the axis of the plastic tubular core stock 70 than is schematically shown in FIG. 4B, and may, for example, consist of a manifold-like structure for directing a series of flame jets against the surface of the plastic tubular core stock 70. Any suitable fuel may be used, such as, for example, natural gas. Alternatively, the heat source 78 may use an electrical, optical, or other type of energy source.

In this manner, the outer surface of the plastic tubular core stock 70 will be heat-softened to the point that when the tubular knitted pile fabric 30 is placed upon the heat-softened outer surface 80 of the plastic tubular core stock 70, the tubular knitted pile fabric 30 will in effect fused onto the plastic tubular core stock 70. Thus, the tubular knitted pile fabric 30 and the plastic tubular core stock 70 will become an integral unitary extended length paint roller cover assembly. The heat fusing will also act to retain the pile fibers on the tubular knitted pile fabric 30.

Figure 4C:
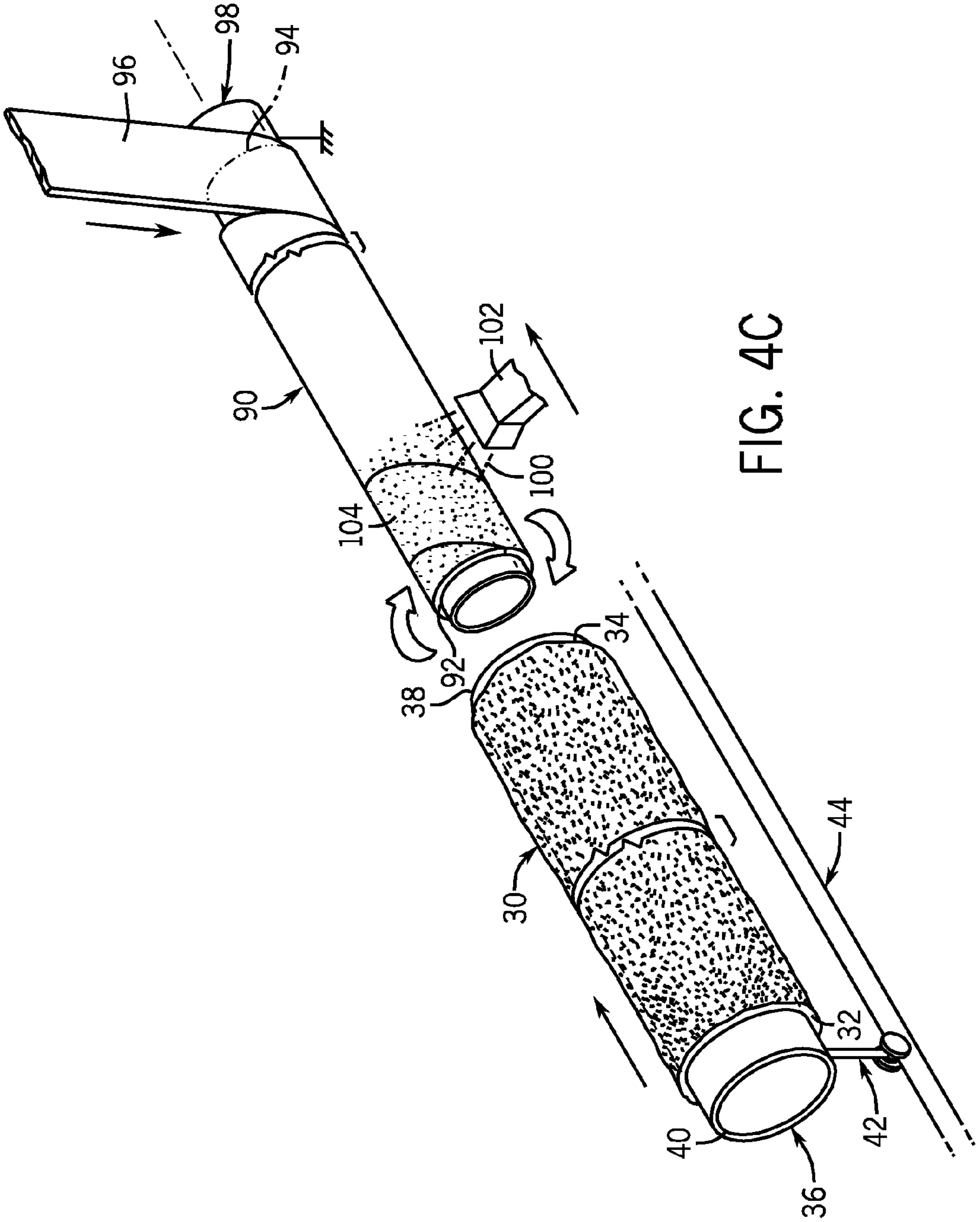
FIG. 4C is a schematic isometric depiction showing the segment of the mounting tube with the tubular paint roller cover fabric thereupon shown in FIG. 3 located adjacent to a hollow, cylindrical core that is being formed on a mandrill from a helically-wound strip of thermoplastic material that subsequently has a liquid thermoplastic material or glue coated onto its outer surface to produce an adhesive outer surface on the core.

Referring now to FIG. 4C, the tubular knitted pile fabric 30 is to be affixed onto a length of plastic tubular core stock 90 having a first end 92 and a second end 94 that is manufactured by helically winding one or more strips of thermoplastic material 96 about a rotating mandrill 98, which, like the core support member 56 in FIG. 4A, is schematically illustrated as being in a fixed location to support the plastic tubular core stock 90 in coaxial alignment with the mounting tube 36. The strip(s) of thermoplastic material 96 may be made of polypropylene or any suitable thermoplastic material having the desired characteristics. The strip(s) of thermoplastic material 96 are wound together in an overlapping relation about the mandrill 98 to form the plastic tubular core stock 90.

The strip of thermoplastic material 96 used to make the plastic tubular core stock 90 may be bonded together by a thermoplastic material, again preferably polypropylene, that is applied to the strip of thermoplastic material 96 in liquid form, for example by sufficiently heating polypropylene to liquefy it, and then feeding it to the strips. The strip(s) of thermoplastic material 96 are rapidly bonded together to form the plastic tubular core stock 90 as the liquid polypropylene cools and sets. Alternately, liquefied thermoplastic may be applied to a belt (not shown herein) that transfers the rapid setting liquefied thermoplastic to the mandrill 98.

After the plastic tubular core stock 90 is formed, an adhesive 100, which may, for example, be a liquid thermoplastic material such as liquid polypropylene, may be applied to the outer surface of the plastic tubular core stock 90 by an applicator 102. In this manner, the outer surface of the plastic tubular core stock 90 will be coated with the adhesive 100 such that when the tubular knitted pile fabric 30 is placed upon the adhesive-coated outer surface 104 of the plastic tubular core stock 90 (which may be performed by stopping rotation of the plastic tubular core stock 90 while the tubular knitted pile fabric 30 is placed onto the plastic tubular core stock 90), the tubular knitted pile fabric 30 will be bonded onto the plastic tubular core stock 90 by the adhesive 100. The adhesive 100 will also act to retain the pile fibers on the tubular knitted pile fabric 30.

Figure 4D:
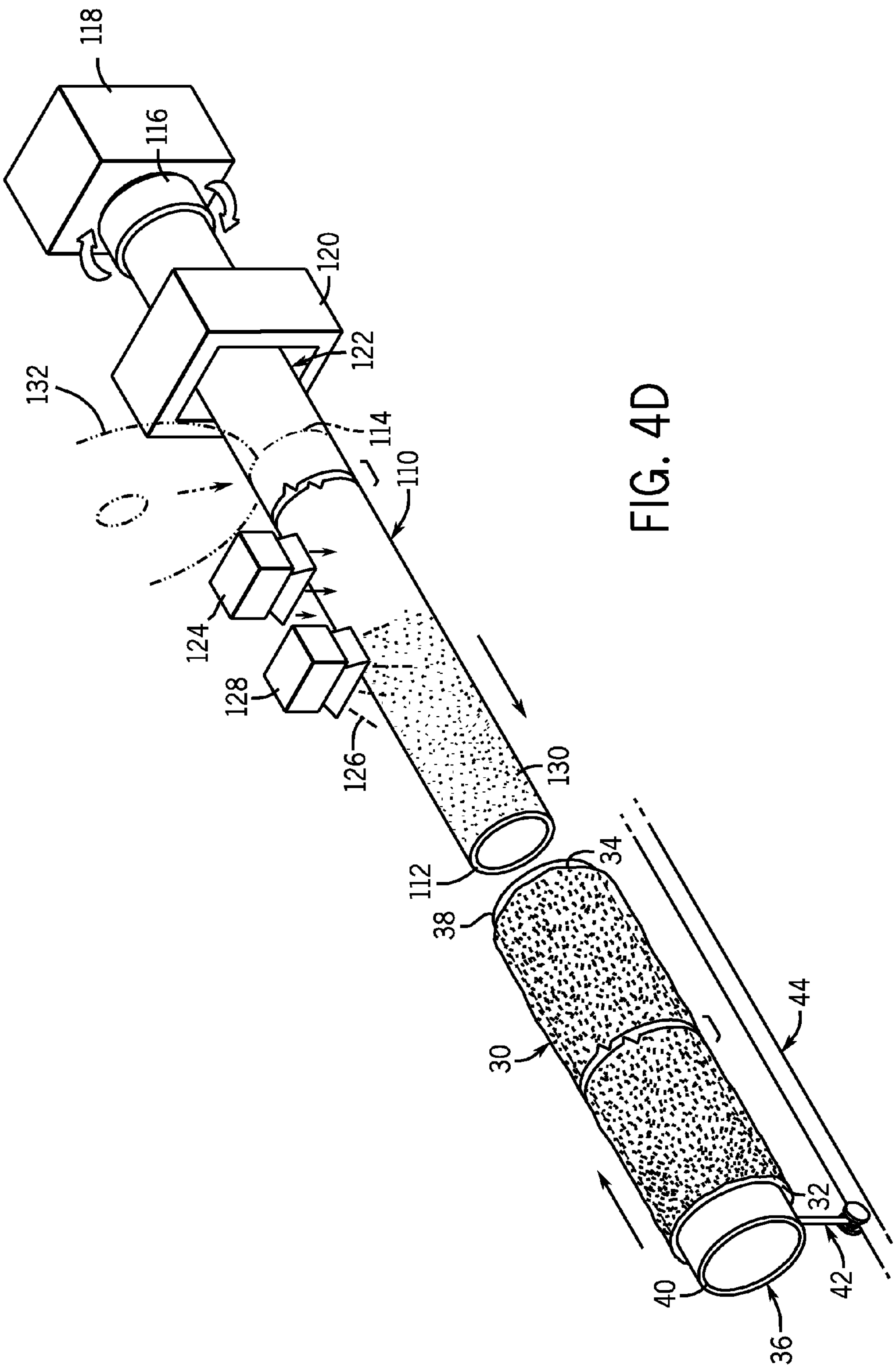
FIG. 4D is a schematic isometric depiction showing the segment of the mounting tube with the tubular paint roller cover fabric thereupon shown in FIG. 3 located adjacent to a hollow, cylindrical core that is being formed by an extruder having a rotating head, with the core subsequently having its outer surface plasma treated and epoxy coated to produce an adhesive outer surface on the core.

Referring next to FIG. 4D, the tubular knitted pile fabric 30 is to be affixed onto a length of plastic tubular core stock 110 having a first end 112 and a second end 114 which is extruded through a rotating extruder head 116 on an extruder 118. The extruder 118 receives a plastic resin, which may be polypropylene or any other suitable thermoplastic material having the desired characteristics. The plastic resin melts and is extruded through the rotating extruder head 116 into the plastic tubular core stock 110, that rotates and moves forward at a constant velocity. The plastic tubular core stock 110 enters a vacuum sizing and cooling tank 120 where a vacuum is applied to the exterior of the plastic tubular core stock 110 along with chilled water spray that cools the plastic tubular core stock 110 down to a point at which full stability is achieved in the plastic material it is made of.

The plastic tubular core stock 110 is shown as being removably attached to a successive plastic tubular core stock 122 extending from the rotating extruder head 116 of the extruder 118, which supports the plastic tubular core stock 110 in coaxial alignment with the mounting tube 36. In the preferred embodiment, the external surface of the plastic tubular core stock 110 is treated with high voltage electrical plasma by a surface treater 124 in order to cause the outer surface of the plastic tubular core stock 110 to attract and accommodate adhesive. A thin layer of epoxy 126 or some other suitable adhesive is applied to the outer surface of the plastic tubular core stock 110 by an epoxy extrusion unit 128. The epoxy 126 may be, for example, the adhesive resins sold under the trademarks MASTERGRIP 5200, 5300, or 5408, which are available from Fielco Industries of Huntingdon Valley, Pa.

In this manner, the outer surface of the plastic tubular core stock 110 will be coated with the epoxy 126 such that when the tubular knitted pile fabric 30 is placed upon the epoxy-coated outer surface 130 of the plastic tubular core stock 110 (which may be performed by stopping rotation of the plastic tubular core stock 110 while the tubular knitted pile fabric 30 is placed onto the plastic tubular core stock 110), the tubular knitted pile fabric 30 will become adhesively secured onto the plastic tubular core stock 110. Thus, the tubular knitted pile fabric 30 and the plastic tubular core stock 110 will become an integral unitary extended length paint roller cover assembly. The epoxy 126 also acts to retain the pile fibers on the tubular knitted pile fabric 30. Following installation of the tubular knitted pile fabric 30 onto the plastic tubular core stock 110, it may be cut by the cutting blade 132 and removed from the successive plastic tubular core stock 122.

Referring next to FIGS. 5 through 10, the continuation of the process of installing and affixing the tubular knitted pile fabric 30 onto the epoxy-coated outer surface 64 of the plastic tubular core stock 50 is shown. It will be appreciated by those skilled in the art that the process shown in FIGS. 5 through 10 for the installation of the tubular knitted pile fabric 30 onto the epoxy-coated outer surface 64 of the plastic tubular core stock 50 is identical in all respects to the installation of the tubular knitted pile fabric 30 onto each of the heat-softened outer surface 80 of the plastic tubular core stock 70 (shown in FIG. 4B), the adhesive-coated outer surface 104 of the plastic tubular core stock 90 (shown in FIG. 4C), and the epoxy-coated outer surface 130 of the plastic tubular core stock 110 (shown in FIG. 4D).

In the position shown in FIG. 4A, the first end 52 of the plastic tubular core stock 50 coated with the epoxy 60 is about to be inserted into the interior of the first end 38 of the mounting tube 36. In the rightmost of the two positions (in which it is shown entirely in dotted lines in FIG. 5), the first end 52 of the plastic tubular core stock 50 coated with the epoxy 60 is shown inserted approximately one-third of the way into the interior of the mounting tube 36 from the first end 38 thereof. Finally, in the leftmost of the two positions shown partially in solid lines in FIG. 5, the first end 52 of the plastic tubular core stock 50 coated with the epoxy 60 is shown inserted into the interior of the mounting tube 36 near to the second end 40 of the mounting tube 36 such that the portion of the plastic tubular core stock 50 having the epoxy-coated outer surface 64 is fully or nearly fully within the mounting tube 36.

Figure 6:
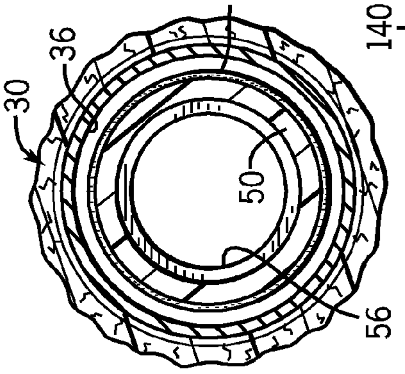
FIG. 6 is a cross-sectional depiction of the mounting tube with the tubular paint roller cover fabric located thereupon and the core with an adhesive outer surface located therein as shown in FIG. 5.

Referring for the moment to FIG. 6, it may be seen that the epoxy-coated outer surface 64 of the plastic tubular core stock 50 is spaced away from the interior of the mounting tube 36, such that the epoxy-coated outer surface 64 does not touch the mounting tube 36. This is important to ensure that the epoxy-coated outer surface 64 does not come into contact with the inside of the mounting tube 36 whereby it could deposit adhesive material on the inside of the mounting tube 36. It will be appreciated by those skilled in the art that the clearances must be very fine to keep the outer diameter of the mounting tube 36 as small as possible to avoid unduly stretching the tubular knitted pile fabric 30 which is stretched to place it on the outside of the mounting tube 36.

Figure 7:
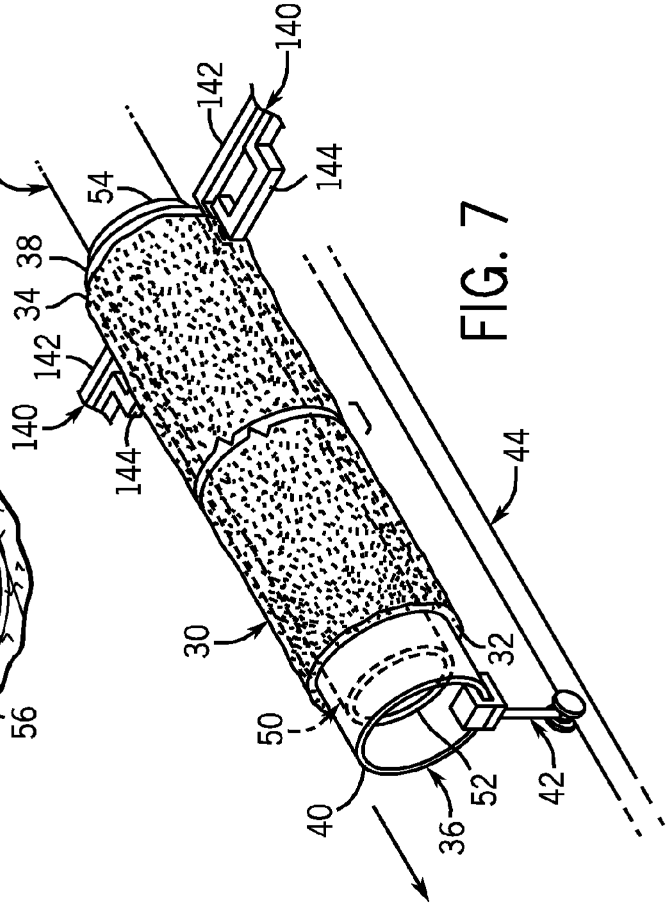
FIG. 7 is a schematic isometric depiction of the elements shown in FIG. 5, showing an end of the tubular paint roller cover fabric being pulled off of the outer surface of the mounting tube and onto the adhesive outer surface of the core as the core begins to be withdrawn from the interior of the mounting tube.

Referring next to FIG. 7, the process of installing the tubular knitted pile fabric 30 onto the plastic tubular core stock 50 is initiated by withdrawing the mounting tube 36 from the tubular knitted pile fabric 30 while maintaining the tubular knitted pile fabric 30 and the plastic tubular core stock 50 stationary with respect to each other. Those skilled in the art will immediately understand that this can done in one of two ways: first, by moving the mounting tube 36 to withdraw it from the tubular knitted pile fabric 30 while maintaining the tubular knitted pile fabric 30 and the plastic tubular core stock 50 stationary; or second, by simultaneously moving the tubular knitted pile fabric 30 and the plastic tubular core stock 50 together away from the mounting tube 36 while maintaining the mounting tube 36 stationary. (It would also be possible to move the tubular knitted pile fabric 30 and the plastic tubular core stock 50 together away from the mounting tube 36 while simultaneously moving the mounting tube 36 away from the tubular knitted pile fabric 30 and the plastic tubular core stock 50.)

The method shown in FIGS. 7 and 8 uses the easiest of these alternative methods, namely longitudinally moving the mounting tube 36 to withdraw it from the tubular knitted pile fabric 30 while maintaining both the tubular knitted pile fabric 30 and the plastic tubular core stock 50 stationary. The tubular knitted pile fabric 30 may, for example, be maintained in place with respect to the plastic tubular core stock 50 through the use of several clamp carriers 140 that grip the second end 34 of the tubular knitted pile fabric 30 to assist in pulling the tubular knitted pile fabric 30 off of the mounting tube 36. Each of the clamp carriers 140 may include an L-shaped member 142 and a C-shaped member 144 which are used to engage the second end 34 of the tubular knitted pile fabric 30.

The base of the "L" of the L-shaped member 142 is slipped under the second end 34 of the tubular knitted pile fabric 30 such that it engages the inside of the tubular knitted pile fabric 30 at the second end 34 thereof. The base of the "C" of the C-shaped member 144 then engages the outside of the tubular knitted pile fabric 30 at the second end 34 thereof at a the same location as the base of the "L" of the L-shaped member 142. The L-shaped member 142 and the C-shaped member 144 are then manipulated to pinch the tubular knitted pile fabric 30 at the second end 34 thereof therebetween and thus retain the tubular knitted pile fabric 30 in the clamp carriers 140 to enable the tubular knitted pile fabric 30 to be manipulated by the clamp carrier 140.

Thus, in FIG. 7, it may be seen that the clamp carriers 140 have engaged the tubular knitted pile fabric 30 at the second end 34 thereof. In the example shown herein, the core support member 56 will maintain the plastic tubular core stock 50 in a stationary position, and the clamp carriers 140 will maintain the tubular knitted pile fabric 30 in a longitudinally stationary position as the mounting tube 36 is withdrawn from the tubular knitted pile fabric 30. Referring to FIG. 8, it may be seen that the mounting tube 36 is about two-thirds of the way removed from the tubular knitted pile fabric 30. It may also be seen that as the mounting tube 36 is removed from the tubular knitted pile fabric 30, the tubular knitted pile fabric 30 shrinks to conform to the outer surface of the plastic tubular core stock 50, causing the tubular knitted pile fabric 30 to contact the epoxy-coated outer surface 64 (shown in FIG. 4A) and be retained thereby on the outer surface of the plastic tubular core stock 50.

Referring next to FIG. 9, as the process continues, the mounting tube 36 is completely withdrawn from the tubular knitted pile fabric 30, causing the entire length of the tubular knitted pile fabric 30 to conform to the outer surface of the plastic tubular core stock 50. At this point, the clamp carriers 140 are also removed from the tubular knitted pile fabric 30, resulting in the pile fabric covered core assembly 150 shown in FIG. 9. The tubular knitted pile fabric 30 is permanently retained by the epoxy-coated outer surface 64, as shown in FIG. 10.

Figure 11:
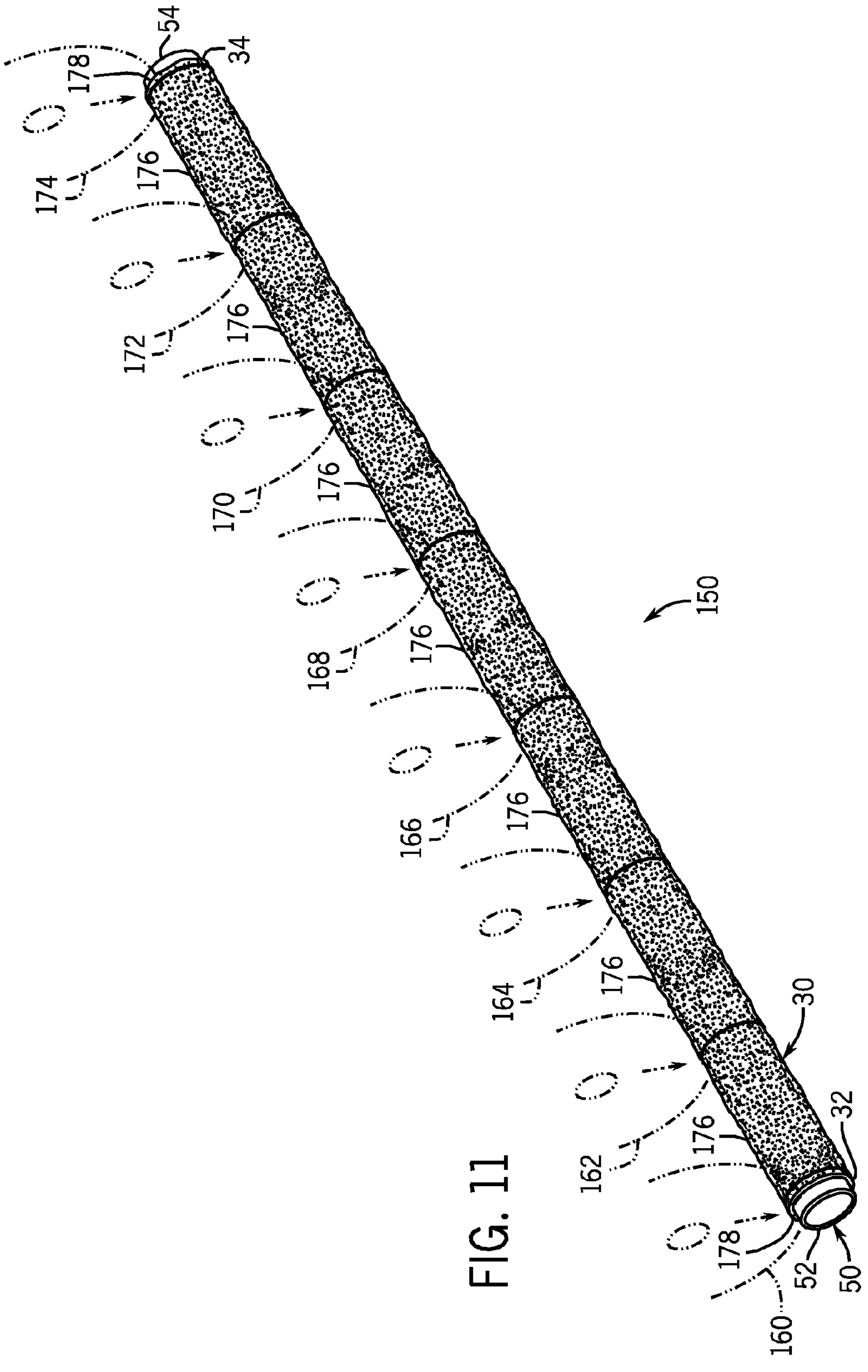
FIG. 11 is a schematic isometric depiction showing the tubular paint roller cover fabric-covered core being cut into paint roller cover-size core member segments.

The pile fabric covered core assembly 150 shown in FIG. 9 is the result irrespective of which of the versions shown in FIGS. 4A through 4D are used. In the exemplary embodiment, the pile fabric covered core assembly 150 is approximately sixty-four inches long, and it can be cut into paint roller cover segments of any desired size. Referring next to FIG. 11, eight cutting blades 160, 162, 164, 166, 168, 170, 172, and 174 are schematically shown (although a single cutting blade that moves in position with respect to the pile fabric covered core assembly 150 may be used instead) to cut the pile fabric covered core assembly 150 into seven nine inch long unfinished paint roller covers 176, with two short end pieces 178 being discarded. Alternatively, dual cutting blades mounted at angles can be used to simultaneously cut and bevel the edges of paint roller cover segments.

Finishing the unfinished paint roller covers 176 will include the steps of combing the pile of the knitted pile fabric on the unfinished paint roller covers 176 and shearing it to the desired length. It should be noted that these finishing steps could instead occur before cutting the pile fabric covered core assembly 150 to segments of the desired length. Finally, the edges of the unfinished paint roller covers 176 are beveled, and any loose fibers are vacuumed off.

Figure 12:
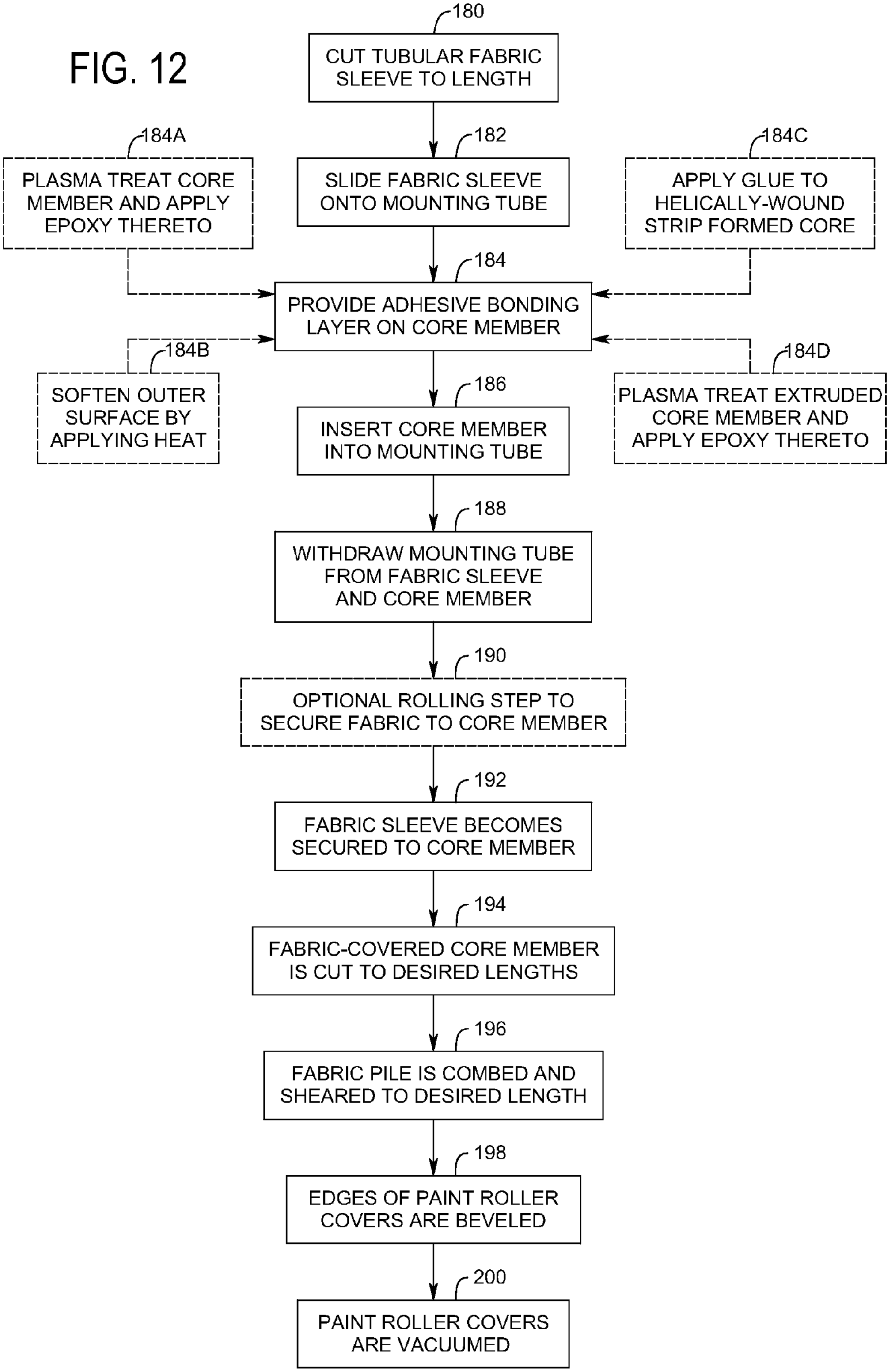
FIG. 12 is a flow diagram showing the manufacturing of a paint roller cover that is made according to the teachings of the present invention, with a number of the steps being those illustrated in FIGS. 1 through 10.

The entire paint roller cover manufacturing method is shown in a flow chart in FIG. 12. The paint roller cover manufacturing operation starts in a cut fabric sleeve to length step 180 in which a potentially very long segment of tubular knitted pile fabric is cut into the tubular knitted pile fabric 30 (shown in FIG. 1). The process next moves to a slide fabric sleeve onto mounting tube step 182 in which the tubular knitted pile fabric 30 is pulled onto the mounting tube 36 (as shown in FIGS. 1 through 3).

Next, the process moves to a provide adhesive bonding layer step 184 in which an adhesive bonding layer is provided on the outer surface of the plastic tubular core stock 50. This may be done in any of several different manners, including the four that correspond with FIGS. 4A through 4D. A first manner is in a plasma treat core and apply epoxy thereto step 184A, which corresponds to the process shown in FIG. 4A in which the external surface of the plastic tubular core stock 50 is treated with high voltage electrical plasma by a surface treater 58 and has a thin layer of epoxy 60 applied thereto by an epoxy extrusion unit 62.

A second manner is in a soften outer surface by applying heat step 184B, which corresponds to the process shown in FIG. 4B in which a heat source 78 is used to soften the outer surface of the plastic tubular core stock 70. A third manner is in an apply glue to helically-wound strip formed core step 184C, which corresponds to the process shown in FIG. 4C in which plastic tubular core stock 90 is manufactured by helically winding a strip of thermoplastic material 96 about a rotating mandrill 98 and the outer surface of the plastic tubular core stock 90 is coated with the adhesive 100. A fourth manner is in a plasma treat extruded core and apply epoxy thereto step 184D, which corresponds to the process shown in FIG. 4D in which plastic tubular core stock 110 is extruded through a rotating extruder head 116 on an extruder 118, processed by the vacuum sizing and cooling tank 120, and has its external surface treated with high voltage electrical plasma by a surface treater 124 and has a thin layer of epoxy 126 applied thereto by an epoxy extrusion unit 128.

Figure 5:
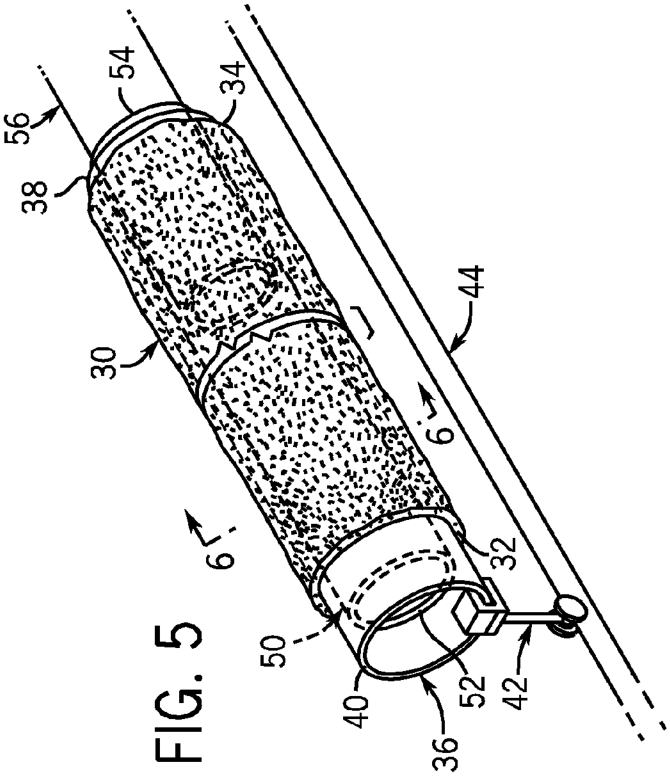
FIG. 5 is a schematic isometric depiction showing any one of the cores with an adhesive outer surface shown in FIG. 4A, 4B, 4C, or 4D mounted onto a support shaft and inserted substantially into the interior of the mounting tube with the tubular paint roller cover fabric located thereupon as shown in FIGS. 3 and 4A, 4B, 4C, or 4D.

Following the provide adhesive bonding layer step 184, the process then moves to an insert core member into mounting tube step 186 (as shown in FIGS. 5 and 6) in which the plastic tubular core stock 50, 70, 90 or 110 having the epoxy-coated outer surface 64, the heat-softened outer surface 80, the adhesive-coated outer surface 104, or the epoxy-coated outer surface 130, respectively, is inserted into the interior of the mounting tube 36, which has the tubular knitted pile fabric 30 located thereupon.

The process next moves to a withdraw mounting tube from fabric sleeve and core member step 188 (shown in FIGS. 7 and 8) in which the mounting tube 36 is withdrawn from the tubular knitted pile fabric 30 while maintaining the tubular knitted pile fabric 30 and the plastic tubular core stock 50 stationary with respect to each other. This results in the tubular knitted pile fabric 30 shrinking to conform to the adhesive bonding layer-coated outer surface of the plastic tubular core stock 50, 70, 90 or 110, thereby creating the pile fabric covered core assembly 150.

Optionally, a rolling to secure fabric to core member step 190 can then be used to use rollers or the like (not shown herein) to apply pressure onto the outside of the pile fabric covered core assembly 150 to enhance the bond created by the adhesive bonding layer between the interior of the tubular knitted pile fabric 30 and the outer surface of the plastic tubular core stock 50, 70, 90 or 110.

With or without the rolling to secure fabric to core member step 190, once the tubular knitted pile fabric 30 has been installed onto the plastic tubular core stock 50, 70, 90 or 110, the tubular knitted pile fabric 30 becomes secured to the outer surface of the plastic tubular core stock 50, 70, 90 or 110 in a fabric sleeve becomes secured to core member step 192 (as shown in FIGS. 9 and 10).

Next, in a cut fabric-covered core member to desired lengths step 194, the pile fabric covered core assembly 150 is cut into a plurality of unfinished paint roller covers 176 of any desired size (as shown in FIG. 11). The unfinished paint roller covers 176 may then have the fabric pile thereupon combed and sheared to a desired length in a comb and shear fabric pile step 196. It should be noted that the comb and shear fabric pile step 196 may instead be performed before the cut fabric-covered core member to desired lengths step 194.

Next, in a bevel edges of paint roller covers step 198, the edges of the unfinished paint roller covers 176 are beveled to finish them. Finally, in a vacuum paint roller covers step 200, loose fibers are vacuumed off the unfinished paint roller covers 176, finishing them into paint roller covers which may then be packaged and sold.

It may therefore be appreciated from the above detailed description of the exemplary embodiments of the present invention that it teaches a method by which a tubular pile fabric may be installed onto the outer surface of a core member. The paint roller cover manufacturing method of the present invention permanently secures the tubular pile fabric to the core member in a manner whereby the tubular pile fabric closely conforms to the outer surface of the core member. In order to facilitate the mass manufacture of paint roller covers, the paint roller cover manufacturing method of the present invention facilitates the installation of an extended length segment of the tubular pile fabric onto an extended length core member, which can be cut into segments of any desired size after the installation of the tubular pile fabric onto the core member.

The tubular pile fabric, which is manufactured with the pile side out, need not be inverted during the process of installing it onto the core member. Further, the knitted pile fabric need not be excessively stretched during its installation onto the core member, thereby ensuring that when the knitted pile fabric is secured to the core member it will not have any wrinkles or other surface defects therein. Additionally, any of a wide variety of different technologies can be used both to manufacture the core member and to secure the knitted pile fabric to the core member.

The method used to install the tubular pile fabric onto the outer surface of a core member results in a construction which is both durable and long lasting, and which, when installed, yields a paint roller cover of superior quality in which the fabric is permanently fixed to the paint roller cover core. The method of the present invention minimizes the cost of manufacture of paint roller covers when compared to conventional methods of manufacturing paint roller covers to thereby enhance its market appeal and afford it the broadest possible market. Finally, all of the aforesaid advantages and aspirations of the paint roller cover manufacturing method of the present invention are achieved without incurring any substantial relative disadvantage.

Although the foregoing description of the paint roller cover manufacturing method of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of manufacturing a paint roller cover, comprising:

placing a tubular knitted pile fabric sleeve having a first end and a second end onto an outer surface of a hollow cylindrical mounting tube having a first outer diameter and an interior having a first inner diameter;

providing an adhesive bonding material on an exterior surface of a tubular core member having a second outer diameter and an interior having a second inner diameter;

inserting said tubular core member having said adhesive bonding material on the exterior surface thereof into said interior of said hollow cylindrical mounting tube said such that said tubular core member having said adhesive bonding material on the exterior surface thereof is located substantially inside said hollow cylindrical mounting tube having said tubular knitted pile fabric sleeve thereupon; and longitudinally displacing said hollow cylindrical mounting tube from said tubular knitted pile fabric sleeve and said tubular core member having said adhesive bonding material on the exterior surface thereof while maintaining the respective longitudinal positions of said tubular knitted pile fabric sleeve with respect to said tubular core member having said adhesive bonding material on the exterior surface thereof, whereupon said tubular knitted pile fabric sleeve becomes secured to said exterior surface of said tubular core member by said adhesive bonding material;

wherein said tubular knitted pile fabric sleeve has a pile side and a backing side which is opposite said pile side, and wherein said tubular knitted pile fabric sleeve is manufactured and provided with its pile side out and is placed onto said outer surface of said hollow cylindrical mounting tube with its pile side out.

2. A method as defined in claim 1, wherein said tubular knitted pile fabric sleeve has an inner diameter that is approximately the same size as or smaller than the outer diameter of said core member.

3. A method as defined in claim 1, wherein said tubular knitted pile fabric sleeve is sufficiently resilient such that it will expand when it is placed onto said hollow cylindrical mounting tube and that it will subsequently shrink back to a size that is approximately the same as its original size following its installation onto said tubular core member.

4. A method as defined in claim 1, wherein said tubular core member has an outer diameter of approximately five inches or less.

5. A method as defined in claim 1, wherein said tubular knitted pile fabric sleeve and said tubular core member are both substantially longer than the length of a paint roller cover.

6. A method as defined in claim 5, additionally comprising:

cutting the assembly comprising said tubular knitted pile fabric sleeve secured to said tubular core member into a plurality of unfinished paint roller covers each covered with knitted pile fabric having pile extending outwardly therefrom and each having edges located at opposite ends thereof.

7. A method as defined in claim 6, additionally comprising:

combing said pile of said knitted pile fabric on said unfinished paint roller covers;

shearing said pile of said knitted pile fabric on said unfinished paint roller covers to the desired length;

beveling said edges of said unfinished paint roller covers; and vacuuming said pile of said unfinished paint roller covers.

8. A method as defined in claim 1, wherein said tubular knitted pile fabric sleeve secured to said tubular core member has pile extending outwardly therefrom and also has edges located at opposite ends thereof, said method additionally comprising:

combing said pile of said knitted pile fabric on said unfinished paint roller cover;

shearing said pile of said knitted pile fabric on said unfinished paint roller cover to the desired length;

beveling said edges of said unfinished paint roller cover; and vacuuming said pile of said unfinished paint roller cover.

9. A method as defined in claim 1, wherein said tubular core member is molded out of a thermoplastic material.

10. A method as defined in claim 1, wherein said tubular core member is manufactured out of a cardboard material.

11. A method as defined in claim 1, wherein said tubular core member is made from one or more helically wound strip(s) of thermoplastic material formed around a mandrill.

12. A method as defined in claim 1, wherein said tubular core member is extruded from an extruder having a rotating extruder head and cooled.

13. A method as defined in claim 1, wherein said adhesive bonding material comprises:

an adhesive.

14. A method as defined in claim 1, wherein said adhesive bonding material comprises:

an epoxy.

15. A method as defined in claim 1, wherein said adhesive bonding material comprises:

a liquid thermoplastic material.

16. A method as defined in claim 1, wherein said tubular core member is made of a thermoplastic material, wherein said tubular knitted pile fabric sleeve is secured to the outside surface of said tubular core member by heating the outer surface of said tubular core member prior to placing said tubular knitted pile fabric sleeve on said outside surface of said tubular core member, whereby said tubular knitted pile fabric sleeve is heat fused to said outside surface of said tubular core member.

17. A method as defined in claim 1, wherein said displacing step comprises:

withdrawing said hollow cylindrical mounting tube from said tubular knitted pile fabric sleeve and said tubular core member having said adhesive bonding material on the exterior surface thereof while maintaining the said tubular knitted pile fabric sleeve and said tubular core member having said adhesive bonding material on the exterior surface thereof in stationary positions, whereupon said tubular knitted pile fabric sleeve becomes secured to said exterior surface of said tubular core member by said adhesive bonding material.

18. A method as defined in claim 1, wherein said displacing step comprises:

maintaining the respective longitudinal positions of said tubular knitted pile fabric sleeve with respect to said tubular core member having said adhesive bonding material on the exterior surface thereof while moving said tubular knitted pile fabric sleeve and said tubular core member having said adhesive bonding material on the exterior surface thereof in a longitudinal direction away from said hollow cylindrical mounting tube, whereupon said tubular knitted pile fabric sleeve becomes secured to said exterior surface of said tubular core member by said adhesive bonding material.

19. A method as defined in claim 1, wherein said displacing step comprises:

moving said hollow cylindrical mounting tube in a first longitudinal direction while simultaneously moving said tubular knitted pile fabric sleeve and said tubular core member having said adhesive bonding material on the exterior surface thereof in an opposite longitudinal direction while also maintaining the respective longitudinal positions of said tubular knitted pile fabric sleeve with respect to said tubular core member having said adhesive bonding material on the exterior surface thereof, whereupon said tubular knitted pile fabric sleeve becomes secured to said exterior surface of said tubular core member by said adhesive bonding material.

20. A method of manufacturing a paint roller cover, comprising:

placing a tubular knitted pile fabric sleeve, having a first end and a second end, a pile side and a backing side opposite said pile side, and being manufactured with its pile side out, with its pile side out onto an outer surface of a hollow cylindrical mounting tube having a first outer diameter and an interior having a first inner diameter;

providing an adhesive bonding material on an exterior surface of a tubular core member having a second outer diameter and an interior having a second inner diameter;

inserting said tubular core member having said adhesive bonding material on the exterior surface thereof into said interior of said hollow cylindrical mounting tube said such that said tubular core member having said adhesive bonding material on the exterior surface thereof is located substantially inside said hollow cylindrical mounting tube having said tubular knitted pile fabric sleeve thereupon; and longitudinally displacing said hollow cylindrical mounting tube from said tubular knitted pile fabric sleeve and said tubular core member having said adhesive bonding material on the exterior surface thereof while maintaining the respective longitudinal positions of said tubular knitted pile fabric sleeve with respect to said tubular core member having said adhesive bonding material on the exterior surface thereof, whereupon said tubular knitted pile fabric sleeve becomes secured to said exterior surface of said tubular core member by said adhesive bonding material with pile extending outwardly from said tubular knitted pile fabric sleeve and said tubular core member and said tubular knitted pile fabric sleeve have adjacent edges located at each end thereof.

21. A method of manufacturing a paint roller cover, comprising:

placing a tubular knitted pile fabric sleeve having a first end and a second end, a pile side and a backing side opposite said pile side, and being manufactured with its pile side out, with its pile side out onto an outer surface of a hollow cylindrical mounting tube having a first outer diameter and an interior having a first inner diameter;

providing an adhesive bonding material on an exterior surface of a tubular core member having a second outer diameter and an interior having a second inner diameter;

inserting said tubular core member having said adhesive bonding material on the exterior surface thereof into said interior of said hollow cylindrical tube said such that said tubular core member having said bonding material on the exterior surface thereof is located substantially inside said hollow cylindrical mounting tube having said tubular knitted pile fabric sleeve thereupon; and longitudinally displacing at least one of said hollow cylindrical tube on the one hand and said tubular knitted pile fabric sleeve and said tubular core member having said adhesive bonding material on the exterior surface thereof on the other hand from the other of said hollow cylindrical tube on the one hand and said tubular knitted pile fabric sleeve and said tubular core member having said adhesive bonding material on the exterior surface thereof on the other hand while maintaining the respective longitudinal positions of said tubular knitted pile fabric sleeve with respect to said tubular core member having said adhesive bonding material on the exterior surface thereof, whereby said hollow cylindrical tube is withdrawn from said tubular knitted pile fabric sleeve and said tubular core member having said adhesive bonding material on the exterior surface thereof, whereupon said tubular knitted pile fabric sleeve becomes secured to said exterior surface of said tubular core member by said adhesive bonding material.

22. A method of manufacturing a paint roller cover, comprising:

placing a tubular knitted pile fabric sleeve, having a first end and a second end, a pile side and a backing side opposite said pile side, and being manufactured with its pile side out, with its pile side out onto an outer surface of a hollow mounting tube having an interior providing an adhesive bonding material on an exterior surface of a tubular core member;

inserting said core member having said adhesive bonding material on the exterior surface thereof into said interior of said mounting tube said such that said core member having said adhesive bonding material on the exterior surface thereof is located substantially inside said mounting tube having said pile fabric sleeve thereupon; and longitudinally displacing said mounting tube from said pile fabric sleeve and said core member having said adhesive bonding material on the exterior surface thereof while maintaining the respective longitudinal positions of said pile fabric sleeve with respect to said core member having said adhesive bonding material on the exterior surface thereof, whereupon said pile fabric sleeve becomes secured to said exterior surface of said core member by said adhesive bonding material.

* * * * *